(12) United States Patent
Fukuda

(10) Patent No.: US 6,831,707 B2
(45) Date of Patent: Dec. 14, 2004

(54) LIQUID CRYSTAL DISPLAY ELEMENT AND PROJECTION TYPE LIQUID CRYSTAL DISPLAY DEVICE

(75) Inventor: Toshihiro Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 10/045,225

(22) Filed: Nov. 9, 2001

(65) Prior Publication Data

US 2002/0113911 A1 Aug. 22, 2002

(30) Foreign Application Priority Data

Nov. 10, 2000 (JP) .................................... P2000-343634

(51) Int. Cl.$^7$ ................................................ G02F 1/13
(52) U.S. Cl. ........................................................ 349/9
(58) Field of Search .................... 349/9, 95, 5; 359/727

(56) References Cited

U.S. PATENT DOCUMENTS

| | | | | |
|---|---|---|---|---|
| 5,430,562 A | * | 7/1995 | Fushimi et al. ................ 349/5 |
| 5,764,318 A | * | 6/1998 | Kurematsu et al. ............ 349/5 |
| 5,852,479 A | * | 12/1998 | Ueda et al. ..................... 349/9 |
| 5,982,563 A | * | 11/1999 | Nakamura et al. .......... 359/727 |
| 6,144,426 A | * | 11/2000 | Yamazaki et al. ............ 349/95 |
| 6,678,023 B1 | * | 1/2004 | Yamazaki et al. ............ 349/95 |

* cited by examiner

*Primary Examiner*—John F. Niebling
*Assistant Examiner*—Andre' C. Stevenson
(74) *Attorney, Agent, or Firm*—Sonnenschein, Nath & Rosenthal LLP

(57) ABSTRACT

In an liquid crystal panel, a microlens having first and second lens surfaces is placed corresponding to each pixel aperture. The focal position of the second lens surface substantially coincides with the principal point of the first lens surface, and the focal position of the entire microlens substantially coincides with the pixel aperture. In the liquid crystal panel, when incident light having a divergence angle component with respect to the optical axis emerges from the microlens, the divergence angle component is removed.

6 Claims, 11 Drawing Sheets

FIG. 5A

|  | EXAMPLE (TWO LENS SURFACES) | FIRST COMPARATIVE EXAMPLE (LONG FOCAL LENGTH, ONE LENS SURFACE) | SECOND COMPARATIVE EXAMPLE (SHORT FOCAL LENGTH, ONE LENS SURFACE) |
|---|---|---|---|
| SYNTHETIC FOCAL LENGTH (μm/in air) | 41 | 70 | 41 |
| EFFECTIVE APERTURE RATIO (%) | 96 | 86 | 77 |

FIG. 5B

| SIMULATION CONDITIONS | |
|---|---|
| ILLUMINATION SYSTEM | FLY-EYE INTEGRATOR OPTICAL SYSTEM FOR 0.9-INCH PANEL |
| DOT SIZE | 18 × 18 μm |
| APERTURE SIZE | 12 × 12 μm |
| F-NUMBER OF PROJECTION LENS | 1.7 |

$(n1 > ng1, ng2)$ $(n1 < ng1, ng2)$

LIQUID CRYSTAL DISPLAY ELEMENT AND PROJECTION TYPE LIQUID CRYSTAL DISPLAY DEVICE

RELATED APPLICATION DATA

The present application claims priority to Japanese Application(s) No(s). P2000-343634 filed Nov. 10, 2000, which application(s) is/are incorporated herein by reference to the extent permitted by law.

BACKGROUND OF THE INVENTION

1. Field of the Invention

The present invention relates to a liquid crystal display element, and to a projection type liquid crystal display device which displays an image by using the liquid crystal display element.

2. Description of the Related Art

Conventionally, projection type liquid crystal display devices (liquid crystal projectors) which display an image by projecting light optically modulated by a liquid crystal display element (hereinafter referred to as a "liquid crystal panel (LCD)") are known. The projection type liquid crystal display devices can adopt two image projecting methods, namely, a front projection method (front type) for projecting an image from the front side of a screen, and a rear projection method (rear type) for projecting an image from the rear side of the screen. Projection type liquid crystal display devices which produce color display are divided into a single-panel type using a single liquid crystal panel, and a three-panel type using three liquid crystal panels corresponding to light of three colors, red (R), green (G), and blue (B).

FIG. 9 shows the general configuration of an optical system (primarily, an illumination optical system) of a projection type liquid crystal display device as a related art. The projection type liquid crystal display device includes a light source 101, a pair of first and second multilens array integrators (hereinafter referred to as "MLAs") 102 and 103, a PS beam combiner 104, a condenser lens 105, a field lens 106, a liquid crystal panel 107, and a projection lens 108 which are arranged in that order along an optical axis 100. The MLAs 102 and 103 have a plurality of microlenses 102M and 103M, respectively, arranged in a two-dimensional form. The PS beam combiner 104 includes a plurality of half-wave plates 104A arranged corresponding to the boundaries between the adjoining microlenses 103M of the second MLA 103.

In the projection type liquid crystal display device, illumination light emitted from the light source 101 passes through the MLAs 102 and 103, and is divided into a plurality of small beams. The light passed through the MLAs 102 and 103 enters the PS beam combiner 104 as light L10 including a P-polarized light component and an S-polarized light component which intersect each other in a plane perpendicular to the optical axis 100. The PS beam combiner 104 separates the light L10 into two types of polarized light components L11 and L12 (a P-polarized light component and an S-polarized light component, respectively). One of the separated polarized light component L11 emerges from the PS beam combiner 104 while maintaining its direction of polarization (for example, P-polarization direction). The other polarized light component L12 (for example, the S-polarized light component) emerges therefrom after being converted into another polarized light component (for example the P-polarized light component) by the action of the half-wave plate 104A. Consequently, the directions of polarization of the two separated polarized light components L11 and L12 are unified in a specific direction.

The light emerging from the PS beam combiner 104 passes through the condenser lens 105 and the field lens 106, and is directed onto the liquid crystal panel 107. The small beams separated by the MLAs 102 and 103 are enlarged to a magnification which is determined by the focal length fc of the condenser lens 105 and the focal length $f_{ML2}$ of the microlenses 103M in the second MLA 103, and illuminate the entire incident surface of the liquid crystal panel 107. Consequently, a plurality of enlarged beams are superimposed on the incident surface of the liquid crystal panel 107, and the entire incident surface is uniformly illuminated. The liquid crystal panel 107 spatially modulates the incident light according to image signals and emits the light. The light emerging from the liquid crystal panel 107 is projected onto a screen (not shown) by the projection lens 108, thereby forming an image on the screen.

In the liquid crystal panel, a thin-film transistor (TFT) and the like are formed as a driving device on the substrate, and therefore, a shielded region called a black matrix is formed between adjoining pixels. For this reason, the aperture ratio of the liquid crystal panel does not equal 100%. Conventionally, in order to increase the effective aperture ratio of the liquid crystal panel, for example, one or more light-collecting microlenses per dot (per pixel or per subpixel) are placed in the optical axis direction on a counter substrate disposed on the light incident side. Herein, the "effective aperture ratio" of the liquid crystal panel refers to the ratio of light beams emerging from the liquid crystal panel to all light beams incident on the liquid crystal panel. In a projection type liquid crystal display device, in general, the effective aperture ratio of the liquid crystal panel is defined in consideration not only of the light loss of the liquid crystal panel, but also of the eclipse of light by the projection lens disposed on the downstream side.

FIG. 10 shows an example of a structure of the liquid crystal panel 107 using microlenses. For ease of viewing, a part of FIG. 10 is not hatched. The liquid crystal panel 107 includes a pixel electrode substrate 140B, and a counter substrate 140A placed opposed to the pixel electrode substrate 140B on the light incident side thereof with a liquid crystal layer 145 therebetween.

The pixel electrode substrate 140B includes a glass substrate 148, a plurality of pixel electrode portions 146, and a plurality of black matrix portions 147 placed on the light incident side of the glass substrate 148. The pixel electrode portions 146 and the black matrix portions 147 are arranged in a two-dimensional form. Each of the pixel electrode portions 146 is made of a conductive transparent material. Each of the black matrix portions 147 is formed between adjoining pixel electrode portions 146, and is shielded by, for example, a metal film. A switching element such as a TFT (not shown) is formed in each black matrix portion 147 so as to selectively apply a voltage to the adjoining pixel electrode portion 146 according to an image signal.

The counter substrate 140A includes a glass substrate 141, a microlens array 142, and a cover glass 144 arranged in that order from the light incident side. A resin layer 143 is formed between the glass substrate 141 and the microlens array 142. Although not shown, counter electrodes are interposed between the cover glass 144 and the liquid crystal layer 145 so as to generate a potential between the counter electrodes and the corresponding pixel electrode portions 146. The resin layer 143 is made of an optical resin having a refractive index n1.

The microlens array 142 includes a plurality of microlenses 142M made of an optical resin having a refractive index n2 (>n1) arranged in a two-dimensional form corresponding to the pixel electrode portions 146. Each of the microlenses 142M is convex on the light incident side, and has a positive refractive power. The microlens 142M serves to collect light, which is incident thereon via the glass substrate 141 and the resin layer 143, toward the corresponding pixel electrode portion 146. As long as the projection lens 108 disposed on the downstream side has a sufficient F-number, light collected by the microlens 142M and entering an aperture 146A, of light incident on the liquid crystal panel 107, is available for image display. Such a microlens 142M allows more light to enter the aperture 146A of the pixel electrode portion 146 than in a case in which the microlens 142 is not formed. This increases the effective aperture ratio, and enhances the efficiency of light utilization.

Light 211, which enters the liquid crystal panel 107 with such a structure at a divergence angle β with respect to an optical axis 200 of the microlens 142M, is refracted by the power of the microlens 142M, and emerges therefrom while being diverged at a greater angle than in the case in which the microlens 142M is not used. In this case, a divergence angle θ of the emergent light is the sum of an angle α produced by the power of the microlens 142M and the angular component β, and satisfies a condition expressed by the following Equation (1):

$$\theta = \alpha + \beta \quad (1)$$

When it is assumed that the focal length of the microlens 142M is designated $f_{ML}$ and the maximum outer size (diameter) thereof is designated "2a", the angle α produced only by the power of the microlens 142M is defined by the following Equation (2):

$$\tan \alpha = a/f_{ML} \quad (2)$$

The divergence angle (incident divergence angle) β of illumination light incident on the liquid crystal panel 107 is defined by the following Equation (3):

$$\tan \beta = rc/fc \quad (3)$$

Where fc represents the focal length of the condenser lens 105 (FIG. 9), and rc represents the radius thereof.

When the divergence angle of the light emerging from the liquid crystal panel 107 is designated θ, a required F-number (Fno.) of the projection lens 108 is defined by the following Equation (4):

$$Fno. = 1/(2 \sin \theta) \quad (4)$$

In the above-described liquid crystal panel 107, when light having a great divergence angle β enters, it cannot be sufficiently collected in the aperture 146A by the lens action of the microlens 142M, and a part thereof is eclipsed by the black matrix portion 147. When the light emerges from the panel, it diverges at a greater angle by the power of the microlens 142M than in the case using no microlens, and the divergence angle θ is increased, as shown in Equation (1). On the other hand, the projection lens 108 cannot take therein light having a divergence angle more than a predetermined angle which is determined by the F-number defined by Equation (4). For this reason, light having an excessively large emergent divergence angle θ is eclipsed by the projection lens 108 disposed on the downstream side.

From the above, the incident divergence angle θ must be decreased in order for the microlens 142M to improve the efficiency of light utilization. However, a decrease in the incident divergence angle β leads to an increase in the focal length fc of the condenser lens 105, as shown by Equation (3), and also to an increase in the focal length of the microlens 103M of the second MLA 103. Therefore, in order to decrease the incident divergence angle β, the optical path length from the light source 101 to the liquid crystal panel 107 must be increased. Such an increase in optical path length enlarges the total size of the device, and decreases the efficiency of light utilization of the entire illumination optical system including the components disposed upstream from the liquid crystal panel 107. While the eclipse by the projection lens 108 can be avoided by using a lens having a large F-number as the projection lens 108 (for example, approximately 1.2 to 1.5) corresponding to the divergence angle θ, such a lens having a large F-number substantially enhances the design difficulty and increases the cost.

As described above, the illumination optical system and the microlenses 142M of the liquid crystal panel 107 have the following problems (i) to (iii):

(i) Light with a large incident divergence angle β undergoes eclipse at the black matrix portion of the liquid crystal panel or the projection lens.

(ii) By reducing the incident divergence angle β, the effective aperture ratio of the liquid crystal panel is increased, but the efficiency of light utilization of the entire illumination system is decreased and the size of the device is increased.

(iii) The divergence angle θ of light emerging from the liquid crystal panel is the sum of the angle α produced by the power of the microlens and the incident divergence angle β, and the emergent light diverges at a greater angle than in the case in which the microlens is not used. For this reason, the projection lens must have a large F-number corresponding to a large divergence angle θ. This enhances the design difficulty of the projection lens and increases the cost.

The eclipse at the black matrix portion 147 described in (i) above can be reduced by decreasing the focal length of the microlens 142M of the liquid crystal panel 107. In this case, however, the angle α produced by the power of the microlens 142M increases, and the emergent divergence angle θ also increases. This causes the above problem (iii). If the brightness is ensured by decreasing the F-number of the projection lens 108, the imaging performance is affected, and the size and manufacturing cost of the projection lens itself are increased. In an actual projection type liquid crystal display device, the length between the pixel aperture and the microlens is optimized by making the focal length $f_{ML}$ of the microlens 142M long in accordance with the F-number of the projection lens 108. Therefore, the above problems (i) and (ii) remain unsolved.

As shown in FIG. 11, another type of liquid crystal panel has been proposed in which a microlens array 152 is also placed on the side of a pixel electrode substrate 140B, and the angle α produced by a microlens 142M of a microlens array 142 in a counter substrate 140A is nullified when the light emerges from the microlens array 152. The microlens array 142 in the counter substrate 140A is formed directly on the light emergent surface of a glass substrate 141. The other microlens array 152 is made of an optical resin, and is placed on the light emergent side of the pixel electrode substrate 140B. A glass substrate 151 is disposed on the light emergent side of the microlens array 152. The microlens array 152 includes a plurality of microlenses 152M corresponding to the microlenses 142M of the counter substrate 140A. Each microlens 152M is convex on the light emergent side, and has a positive power. The microlens 152M functions as a collimator in combination with the corresponding microlens 142M of the counter substrate 140A. In this liquid crystal panel, refractive indices n1 and n2 of the glass substrate 141 of the counter substrate 140A and the microlens 142M and refractive indices n3 and n4 of the microlens 152M of the pixel electrode substrate 140B and the glass substrate 151 satisfy a condition n2>n1 and n3>n4.

Light incident on this type of liquid crystal panel is first refracted at an angle α by the power of the microlens 142M of the counter substrate 140A, for example, as in incident light 212 shown in FIG. 11. The incident light 212 is then refracted at an angle of −α, which is opposite from the angle α, by the function as a collimator of the microlens 152M on the side of the pixel electrode substrate 140B. Consequently, when the light emerges from the microlens 152M, the angular component α produced by the power of the microlens 142M of the counter substrate 140A is nullified. Since the angular component α is nullified, the emergent divergence angle θ equals β according to Equation (1), and can be made smaller by the angle α than in the type shown in FIG. 10. In this arrangement of the microlenses 152M, for example, when incident light 213 with a divergence angle β enters a microlens 152M-2 next to a microlens 152M-1, the microlens 152M-2 does not function as a collimator for the incident light. In this case, the above relationship "θ=β" is disturbed, and the emergent divergence angle θ is more than the incident divergence angle β. This makes it impossible to increase the effective aperture ratio.

For example, Japanese Unexamined Patent Application Publication No. 5-341283 proposes a liquid crystal panel in which the incident divergence angle β is nullified when light emerges. The liquid crystal panel includes a pair of glass substrates and a liquid crystal layer disposed therebetween, and microlenses are arranged on both sides of at least one of the glass substrates corresponding to pixel apertures. The two microlenses disposed on both sides of the substrate have the same focal length, and the length therebetween is set to be equal to the focal length. For this reason, each of the microlenses has the optical property of collecting incident parallel light adjacent to a surface opposite from the substrate surface where the microlens is formed, thereby nullifying the incident divergence angle β. In this liquid crystal panel, the microlenses are formed by an ion exchange method.

In the above publication, one surface of the microlens is convex toward the inner sides of the substrates, and the other surface (both end surfaces of the substrates) is flat. Moreover, the length between the microlens on the side of the pixel aperture and the pixel aperture is nearly zero. It is thought that the thickness of the substrate with the microlenses is approximately several tens of millimeters. In such a structure, however, it is quite difficult to produce the substrate having microlenses. In particular, in the production using the ion exchange method, it is difficult to adjust the thickness, and to precisely work a thin substrate having a thickness of approximately several tens of millimeters so as to achieve the desired optical properties of the microlenses. For example, while it is thought that there is a need to polish the surfaces of the microlenses disposed at both ends of the substrates, it is quite difficult to precisely polish such thin substrates. In recent years, there have been requests to increase the definition of liquid crystal panels and to decrease the pixel pitch. Consequently, more precise working is necessary. The liquid crystal panel disclosed in the above publication is disadvantageous in this respect.

SUMMARY OF THE INVENTION

The present invention has been made in view of the above problems, and an object of the invention is to provide a liquid crystal display element and a projection type liquid crystal display device in which the efficiency of light utilization is enhanced by increasing the effective aperture ratio without increasing the size and without enhancing the difficulty in production.

In order to achieve the above object, according to an aspect of the present invention, there is provided a liquid crystal display element including a liquid crystal layer, a pixel electrode portion having a plurality of pixel apertures for transmitting light, and at least one microlens array having a plurality of microlenses arranged in a two-dimensional form on at least one of a light incident side and a light emergent side of the liquid crystal layer corresponding to the pixel apertures. Each of the microlenses includes a light-collecting lens having at least one lens surface in the optical axis direction for collecting incident light toward corresponding one of the pixel aperture, and a field lens having at least one lens surface in the optical axis direction so that the focal position thereof substantially coincides with the principal point of the light-collecting lens. Both the light-collecting lens and the field lens may be formed on the light incident side of the liquid crystal layer, or, for example, the light-collecting lens may be formed on the light incident side of the liquid crystal layer and the field lens may be formed on the light emergent side.

Preferably, the focal position of the entirety of each of the microlenses substantially coincides with the pixel aperture. While it is thought that the vignetting factor becomes higher as the focal position of the entire microlens is placed closer to the pixel aperture, the vignetting factor is not always highest when the focal position completely coincides with the pixel aperture, in consideration of all the angular components of the incident light. For example, it is preferable to set the focal position so that the beam waist of the light coincides with the pixel aperture.

According to another aspect of the present invention, there is provided a projection type liquid crystal display device including a light source for emitting light, a liquid crystal display element for optically modulating incident light, and a projection lens for projecting the light modulated by the liquid crystal display element. The present invention is applied to the liquid crystal display element.

In the liquid crystal display element and the projection type liquid crystal display device of the present invention, the efficiency of light utilization is enhanced by increasing the effective aperture ratio without increasing the size and without enhancing the difficulty in production. Furthermore, for example, in a case in which incident light has a divergence angle component with respect to the optical axis, the divergence angle component is removed when the light emerges from the microlens array. Therefore, for example, even when the focal length of the microlens is reduced, the divergence angle of the emergent light is prevented from excessively increasing. This can reduce the eclipse of light by the projection lens used in, for example, the projection type liquid crystal display device.

Further objects, features, and advantages of the present invention will become apparent from the following description of the preferred embodiments with reference to the attached drawings.

BRIEF DESCRIPTION OF THE DRAWINGS

FIGS. 5A and 5B are explanatory views showing a concrete examples of an effective aperture ratio in the liquid crystal panel shown in FIG. 2, and comparative examples.

DESCRIPTION OF THE PREFERRED EMBODIMENTS

Figure 1:
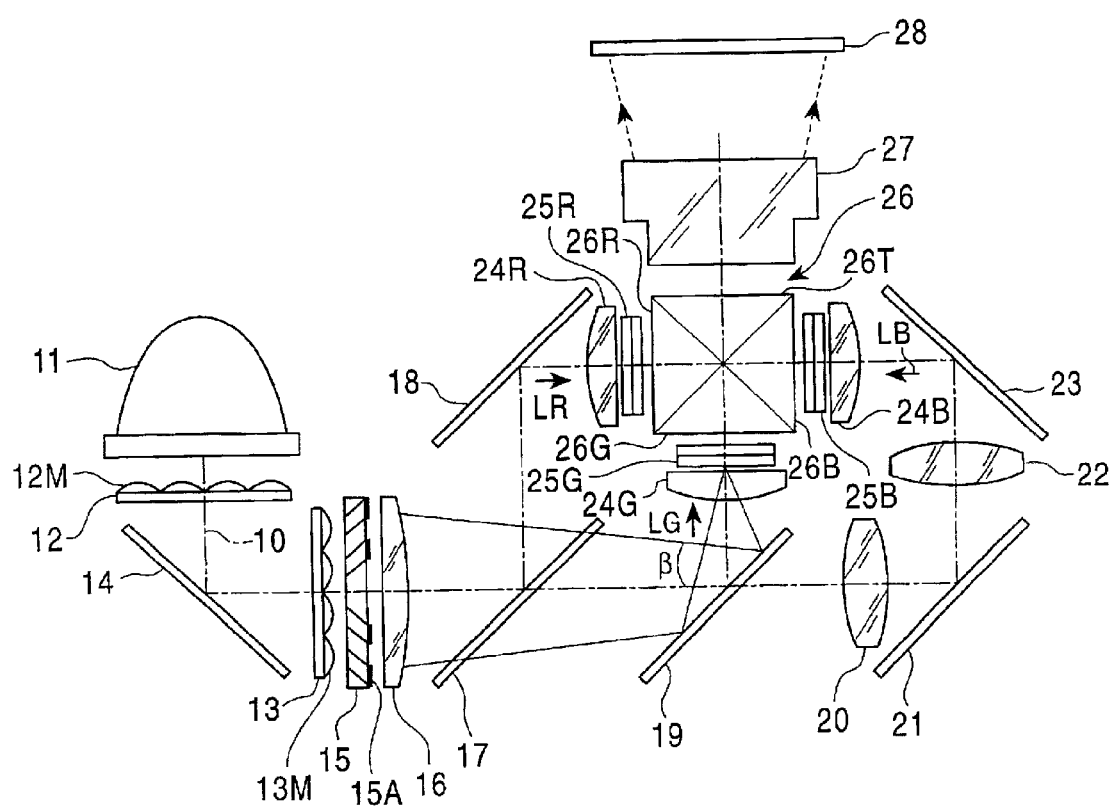
FIG. 1 is a structural view showing the overall configuration of an optical system of a projection type liquid crystal display device according to an embodiment of the present invention.

FIG. 1 shows an example of an overall configuration of a projection type liquid crystal display device according to an embodiment of the present invention. The projection type liquid crystal display device shown in FIG. 1 is of a so-called three-panels type which produces color image display by using three transmissive liquid crystal panels. The projection type liquid crystal display device comprises a light source 11 for emitting light, a pair of first and second multilens array integrators (hereinafter referred to as "MLAs") 12 and 13, and a total reflection mirror 14 disposed between the MLAs 12 and 13 so as to bend an optical path (optical axis 10) at approximately 90° toward the second MLA 13. A plurality of microlenses 12M and 13M are arranged in a two-dimensional form in the MLAs 12 and 13. The MLAs 12 and 13 serve to divide incident light into a plurality of small beams in order to make the illumination distribution uniform.

The light source 11 emits white light which contains red light, blue light, and green light necessary for color image display. The light source 11 includes a light-emitting member (not shown) for emitting white light, and a concave mirror for reflecting and collecting the light emitted from the light-emitting member. The light-emitting member is, for example, a halogen lamp, a metal halide lamp, or a xenon lamp. Preferably, the concave mirror has such a shape as to improve the light collection efficiency, and for example, has a rotationally symmetric shape as in an ellipsoidal mirror and a paraboloidal mirror.

The projection type liquid crystal display device also comprises a PS beam combiner 15, a condenser lens 16, and a dichroic mirror 17 arranged in that order on the light emergent side of the second MLA 13. The dichroic mirror 17 serves to separate incident light into, for example, red light LR and light of another color.

Figure 4:
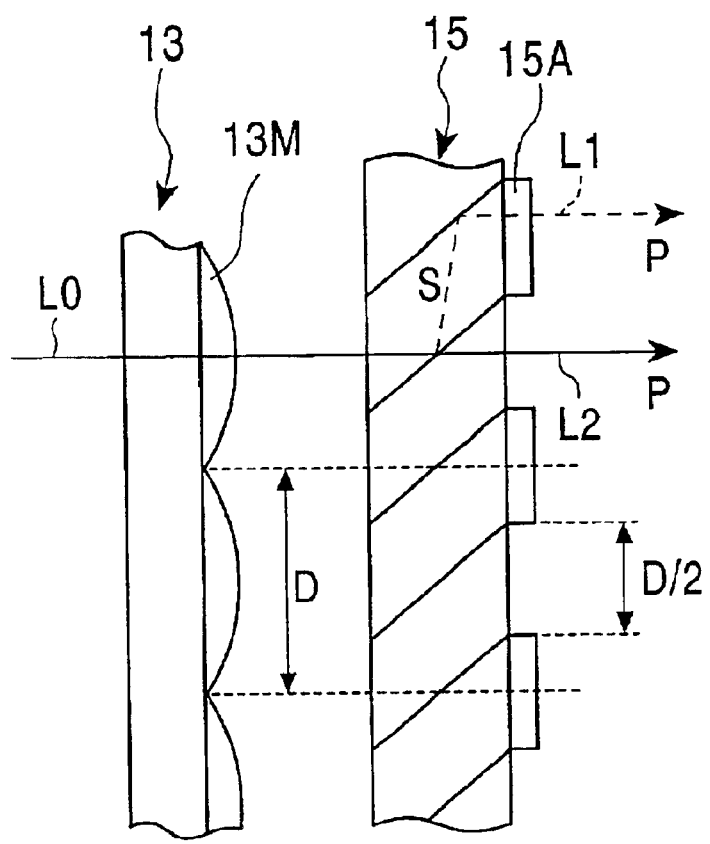
FIG. 4 is a partially enlarged view showing the principal structure of a second microlens array and a PS beam combiner.

The PS beam combiner 15 has a plurality of half-wave plates 15a formed at the positions corresponding to the boundaries between the adjoining microlenses 13M in the second MLA 13. The PS beam combiner 15 serves to separate incident light LO into two types of polarized light components L1 and L2 (a P-polarized light component and an S-polarized light component), as shown in FIG. 4. The PS beam combiner 15 also serves to emit one of the separated polarized light components L2 therefrom while maintaining the direction of polarization (for example, P-polarization direction) and to emit the other polarized light component L1 (for example, an S-polarized light component) after converting the polarized light L1 into another polarized light component (for example, a P-polarized light component) by the action of the half-wave plates 15A.

The projection type liquid crystal display device further comprises a total reflection mirror 18, a field lens 24R, and a liquid crystal panel 25R arranged in that order along the optical path of the red light LR separated by the dichroic mirror 17. The total reflection mirror 18 reflects the red light LR separated by the dichroic mirror 17 toward the liquid crystal panel 25R. The liquid crystal panel 25R serves to spatially modulate the red light LR, which is incident thereon via the field lens 24R, according to image signals.

The projection type liquid crystal display device further comprises a dichroic mirror 19 disposed along the optical path of the other color light separated by the dichroic mirror 17. The dichroic mirror 19 serves to separate incident light into, for example, green light and blue light.

The projection type liquid crystal display device further comprises a field lens 24G and a liquid crystal panel 25G arranged in that order along the optical path of the green light LG separated by the dichroic mirror 19. The liquid crystal panel 25G serves to spatially modulate the green light LG, which is incident thereon via the field lens 24G, according to image signals.

The projection type liquid crystal display device further comprises a relay lens 20, a total reflection mirror 21, a relay lens 22, a total reflection mirror 23, a field lens 24B, and a liquid crystal panel 25B arranged in that order along the optical path of the blue light LB separated by the dichroic mirror 19. The total reflection mirror 21 reflects the blue light LB, which is incident thereon via the relay lens 20, toward the total reflection mirror 23. The total reflection mirror 23 reflects the blue light LB, which is reflected by the total reflection mirror 21 and is incident thereon via the relay lens 22, toward the liquid crystal panel 25B. The liquid crystal panel 25B serves to spatially modulate the blue light LB, which is reflected by the total reflection mirror 23 and is incident thereon via the field lens 24B, according to image signals.

The projection type liquid crystal display device further comprises a crossed prism 26 disposed at the intersection of the optical paths of the red light LR, the green light LG, and the blue light LB so as to synthesize the three color light LR, LG, and LB. The projection type liquid crystal display device further comprises a projection lens 27 for projecting synthetic light emerging from the crossed prism 26 toward a screen 28. The crossed prism 26 has three incident surfaces 26R, 26G, and 26B, and an emergent surface 26T. The red light LR emerging from the liquid crystal panel 25R enters the incident surface 26R, the green light LG emerging from the liquid crystal panel 25G enters the incident surface 26G, and the blue light LB emerging from the liquid crystal panel 25B enters the incident surface 26B. The crossed prism 26 synthesizes the three color light incident on the incident surfaces 26R, 26G, and 26B, and emits the synthesized light from the emergent surface 26T.

Figure 2:
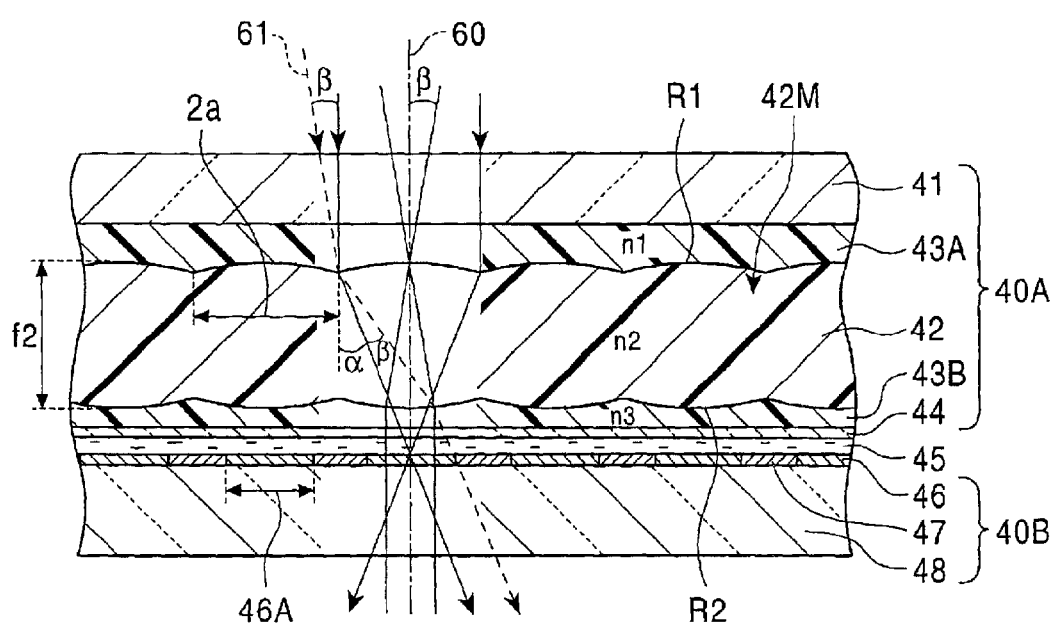
FIG. 2 is a cross-sectional view showing the general structure of a liquid crystal panel in the first embodiment.

FIG. 2 shows an example of a structure of the liquid crystal panels 25R, 25G, and 25B. The liquid crystal panels 25R, 25G, and 25B substantially have the same function and structure except that they modulate different light components. Hereinafter, the structures of the liquid crystal panels 25R, 25G, and 25B will be described collectively. For ease of viewing, a part of FIG. 2 is not hatched. The liquid crystal panel 25 (25R, 25G, and 25B) includes a pixel electrode substrate 40B, and a counter substrate 40A which opposes the incident side of the pixel electrode substrate 40B with a liquid crystal layer 45 therebetween.

The pixel electrode substrate 40B includes a glass substrate 48, and a plurality of pixel electrode portions 46 and a plurality of black matrix portions 47 arranged on the incident side of the glass substrate 48. The pixel electrode substrate 40B also includes an alignment film (not shown) interposed between the pixel electrode portions 46 and the black matrix portions 46, and the liquid crystal layer 45. The pixel electrode portions 46 and the black matrix portions 47 are arranged in a two-dimensional form. The pixel electrode portions 46 are formed of a transparent conductive material. Each of the black matrix portions 47 is formed between the adjoining pixel electrode portions 46, and is shielded by, for example, a metal film. The black matrix portion 47 has therein a switching element such as a TFT (not shown) for selectively applying a voltage to the adjoining pixel electrode portion 46 according to image signals. An open region of one pixel electrode portion 46 surrounded by the black matrix portions 47 transmits incident light, and forms a pixel aperture 46A for one pixel.

The counter substrate 40A includes a glass substrate 41, a first resin layer 43A, a microlens array 42, a second resin layer 43B, and a cover glass 44 arranged in that order from the light incident side. The counter substrate 40A also includes counter electrodes and an alignment film (both not shown) formed between the cover glass 44 and the liquid crystal layer 45. Each counter electrode generates a potential in cooperation with the corresponding pixel electrode 46.

The microlens array 42 is made of an optical resin, and includes a plurality of microlenses 42M arranged in a two-dimensional form corresponding to the pixel electrode portions 46. Each of the microlenses 42M has a positive refractive power as a whole, and serves to collect light incident on the liquid crystal panel 25 toward the corresponding pixel electrode portion 46. When the projection lens 27 disposed on the downstream side has a sufficient F-number, most of the light, which enters the liquid crystal panel 25, is collected by the microlens 42M, and enters the pixel aperture 46A, is available for image display. In order to effectively use the emergent light from the liquid crystal panel 25, it is preferable that the F-number of the projection lens 27 be more than or nearly equal to the numerical aperture of the microlens 42M.

In each microlens 42M, two lens surfaces R1 and R2 are arranged in the optical axis direction for one pixel aperture 46A, that is, per dot (per pixel or per subpixel). The lens surfaces R1 and R2 have a positive power. In FIG. 2, the lens surfaces R1 and R2 are spherical, the first lens surface R1 is convex on the light incident side (light-source side), and the second lens surface R2 is convex on the light emergent side. In order for the lens surfaces R1 and R2 having such shapes to have a positive power, the refractive indices n1, n2, and n3 of the first resin layer 43A, the microlens array 42, and the second resin layer 43b are set to have a relationship n2>n1, n3. Preferably, the relative difference between the refractive indices n2 and n1 is as large as possible, for example, approximately 0.2 to 0.3. This also applies to n2 and n3.

In each microlens 42M, the focal position of the second lens surface R2 substantially coincides with the principal point H1 (see FIG. 3) of the first lens surface R1, and the focal position of the entire microlens 42M substantially coincides with the position of the pixel aperture 46A. The first lens surface R1 forms a light-collecting lens, and the second lens surface R2 forms a field lens. The optical operations and advantages of the microlens 42M which satisfy the above optical conditions will be described in detail later.

While it is thought that the vignetting factor increases as the focal position of the microlens is placed closer to the pixel aperture, the vignetting factor is not always highest when the focal position completely coincides with the pixel aperture. In consideration of all the angular components of the incident light, it is preferable that the focal position be placed, for example, so that the beam waist of the light coincides with the pixel aperture.

It is satisfactory as long as the first resin layer 43A, the microlens array 42, and the second resin layer 43B are structured so that the lens surfaces R1 and R2 have a positive power and the predetermined optical characteristics, and the shapes thereof are not limited to those shown in the figures. As long as a sufficient power to cause the microlens 42M to properly function can be ensured, the resin layers 43A and 43B may be omitted and the microlens array 42 may be directly formed between the glass substrate 41 and the cover glass 44, as described in the following modification.

A brief description will now be given of a method of producing the microlens array 42 in the liquid crystal panel 25. First, the first resin layer 43A and the second resin layer 43B are formed. The first resin layer 43A is formed by, for example, molding an acrylic resin by a stamper having a pattern of the first lens surfaces R1 of the microlenses 42M thereon. Similarly, the second resin layer 43B is formed by, for example, molding an acrylic resin by a stamper having a pattern of the second lens surfaces R2 of the microlenses 42M thereon. The two resin layers 43A and 43B thus molded are placed opposed to each other, and the space therebetween is filled with an optical resin (for example, urethane or acrylic resin) as the material of the microlens array 42. The filled resin also functions as an adhesive so as to combine the first resin layer 43A, the microlens array 42, and the second rein layer 43B. After that, the surfaces of the first resin layer 43A and the second resin layer 43B are polished. The production method for the microlens array is not limited to the above method, and other methods may be adopted.

In the liquid crystal panel 25, the cover glass 44, the alignment film (not shown), and the liquid crystal layer 45 are interposed between the second lens surface R2 and the pixel aperture 46A. Preferably, the thicknesses thereof are set to be as small as possible (for example, the total thickness is approximately 5 μm to 25 μm in air).

Next, the operation of the projection type liquid crystal display device having the above configuration will be described.

First, the general operation of the projection type liquid crystal display device will be described with reference to FIG. 1. White light emitted from the light source 11 is divided into a plurality of small beams by being transmitted through the MLAs 12 and 13. The light transmitted through the MLAs 12 and 13 enters the PS beam combiner 15. Incident light LO on the PS beam combiner 15 includes a P-polarized light component and an S-polarized light component which intersect in a plane perpendicular to the optical axis 10. The PS beam combiner 15 separates the incident light LO into two types of polarized light components (a P-polarized light component and an S-polarized light component) L1 and L2, as shown in FIG. 4. One of the separated polarized light components L2 emerges from the PS beam combiner 15 while maintaining its direction of polarization (for example, P-polarization direction). The other polarized light component L1 (for example, the S-polarized light component) emerges after being converted into another polarized light component (for example, the P-polarized light component) by the action of the half-wave plate 15A. Consequently, the directions of polarization of the two separated polarized light components L1 and L2 are unified in a specific direction (for example, P-polarization direction).

The light emerging from the PS beam combiner 15 passes through the condenser lens 16, and enters the dichroic mirror 17. For example, the incident light is separated into red light LR and light of another color by the action of the dichroic mirror 17.

The red light LR separated by the dichroic mirror 17 is reflected toward the liquid crystal panel 25R by the total reflection mirror 18, and enters the liquid crystal panel 25R via the field lens 24R. The incident red light LR is spatially modulated according to image signals in the liquid crystal panel 25R, and then enters the incident surface 26R of the crossed prism 26.

In contrast, the other color light separated by the dichroic mirror 17 enters the dichroic mirror 19, and is separated into, for example, green light LG and blue light LB. The green light LG separated by the dichroic mirror 19 enters the liquid crystal panel 25G via the field lens 24G. The green light LG is spatially modulated according to image signals in the liquid crystal panel 25G, and then enters the incident surface 26G of the crossed prism 26.

The blue light LB separated by the dichroic mirror 19 enters the total reflection mirror 21 via the relay lens 20, and is reflected therefrom toward the total reflection mirror 23. The blue light LB then enters the total reflection mirror 23 via the relay lens 22, and is reflected therefrom toward the liquid crystal panel 25B. The blue light LB enters the liquid crystal panel 25B via the field lens 24B, is spatially modulated according to image signals, and then enters the incident surface 26B of the crossed prism 26.

A plurality of beams separated by the MLAs 12 and 13 are enlarged and superimposed on the incident surfaces of the liquid crystal panels 25R, 25G, and 25B, and uniformly illuminate the incident surfaces. The beams are enlarged to a magnification which is determined based on the focal length fc of the condenser lens 16 and the focal length $f_{MLA2}$ of the microlens 13M in the second MLA 13.

The three color light LR, LG, and LB are synthesized by the crossed prism 26, and emerge from the emergent surface 26T toward the projection lens 27. The emergent light is projected onto the front or back side of the screen 28 by the projection lens 27, thereby forming an image on the screen 28.

The optical operations and advantages of the microlenses 42M in the liquid crystal panel 25, which is the principal part of this embodiment, will now be described mainly with reference to FIG. 3.

Figure 3:
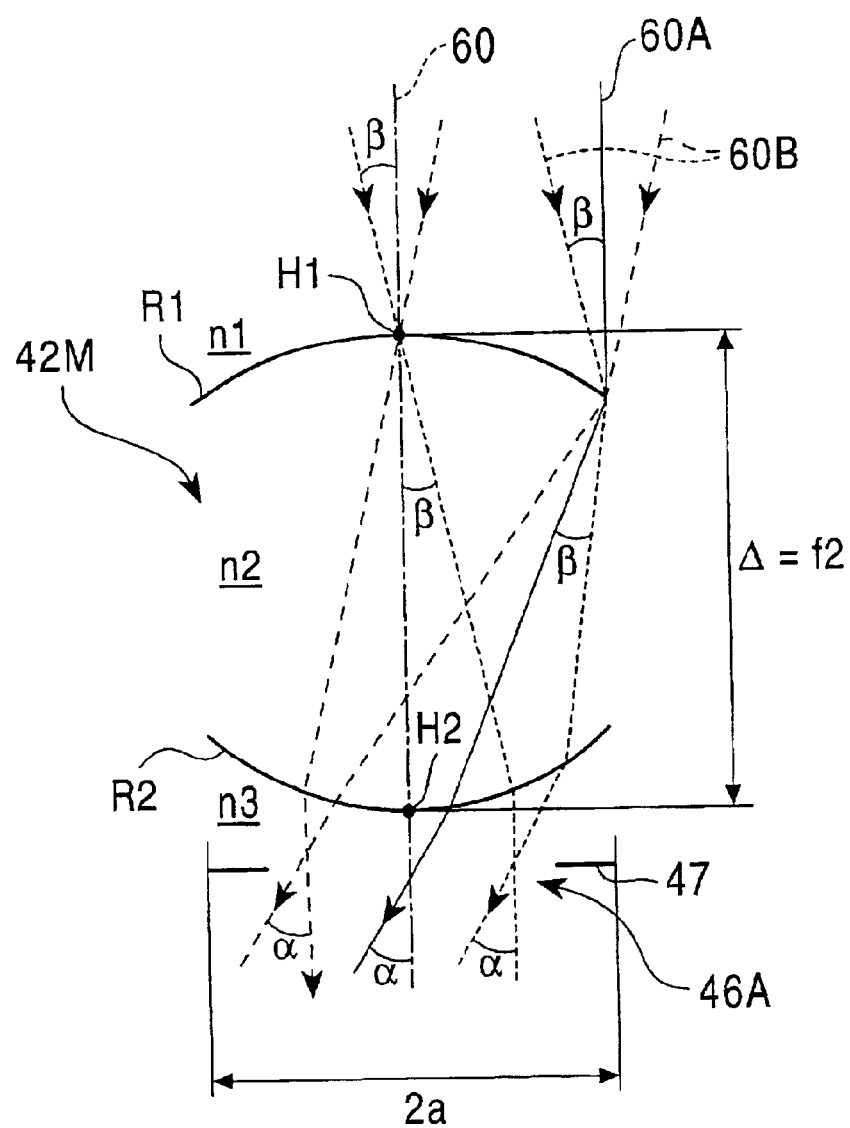
FIG. 3 is a simplified view showing the structure of a microlens section in the liquid crystal panel shown in FIG. 2.

FIG. 3 shows only the principal components of the microlens section of the liquid crystal panel 25 in order to simplify the description. As described above, the first lens surface R1 and the second lens surface R2 of the microlens 42M have a positive power. The focal position of the second lens surface R2 substantially coincides with the principal point H1 of the first lens surface R1, and the focal position of the entire microlens substantially coincides with the pixel aperture 46A. In the following description, it is assumed that the entire liquid crystal panel 25 is illuminated with illumination light having a divergence angle β emitted from the illumination optical system disposed on the upstream side.

First, a description will be given of a principal ray 60A (shown by a solid line) in parallel with an optical path 60 of the microlens 42M. The principal ray 60A is collected adjacent to the pixel aperture 46A by the power of the entire microlens. The maximum divergence angle α of the light emerging from the microlens 42M with respect to the optical axis 60 is determined by the relationship between the maximum outer size of the microlens 42M and the synthetic focal length of the entire microlens 42M. More specifically, the maximum divergence angle α is given by the following Equation (5):

$$\tan \alpha = a/f \tag{5}$$

Where 2a represents the diameter, and f represents the synthetic focal length.

The synthetic focal length f is given by the following Equation (6):

$$f = f1 \times f2/(f1+f2-\Delta) \tag{6}$$

Where f1 represents the focal length of the first lens surface R1, f2 represents the focal length of the second lens surface R2, and Δ represents the distance (principal distance) between the principal point H1 of the first lens surface R1 and the principal point H2 of the second lens surface R2.

When the focal position of the second lens surface R2 and the principal point H1 of the first lens surface R1 coincide with each other, Δ equals f2, and therefore, the synthetic focal length f is given by the following Equation (7):

$$f = f2 \tag{7}$$

Equation (7) shows that the synthetic focal length f is a constant value f2, regardless of the focal length f1 of the first lens surface R1. Equations (5) and (7) show that the maximum divergence angle α of the emergent light of the principal ray 60A is directly and exclusively determined by the radius "a" of the microlens 42M and the focal length f2 of the second lens surface R2. In this case, the synthetic focal position of the entire lens can be controlled with the synthetic focal length f fixed, based on the focal length f1 of the first lens surface R1. By appropriately setting the focal length f1, a distance between the pixel aperture 46A and the second lens surface R2 necessary for working can be ensured.

Next, divergent light 60B (shown by a broken line) which enters the optical axis 60 with an angular component will be described. Light, which illuminates the liquid crystal panel 25 at angles of ±β with respect to the optical axis 60, passes through the first lens surface R1 while it diverges at ±β with respect to the principal ray 60A. The light is turned parallel to the principal ray 60A when passing the second lens surface R2 because the focal position of the second lens surface R2 substantially coincides with the principal point H1 of the first lens surface R1. That is, the principal ray 60A and the divergent light 60B are equal in the maximum divergence angle α after emerging from the microlens 42M.

By mounting the microlens 42M having the above-described optical action, the maximum divergence angle θ of the light emerging from the liquid crystal panel 25 is given by the following Equation (8):

$$\theta = \alpha \tag{8}$$

Figure 10:
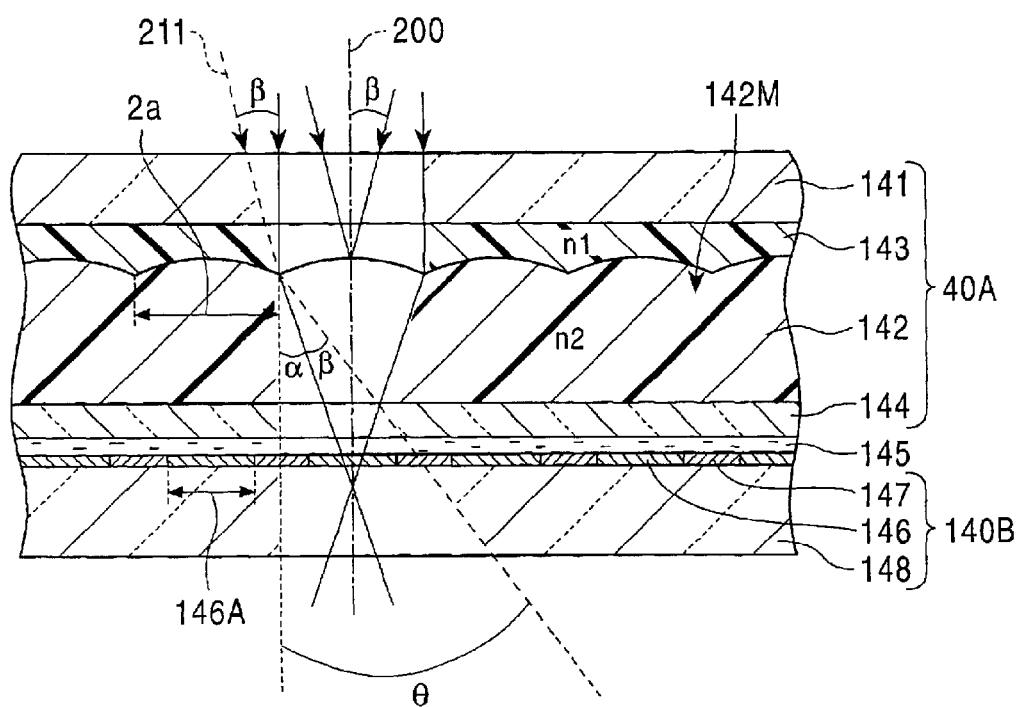
FIG. 10 is a cross-sectional view showing an example of a structure of a known type of liquid crystal panel.
Figure 11:
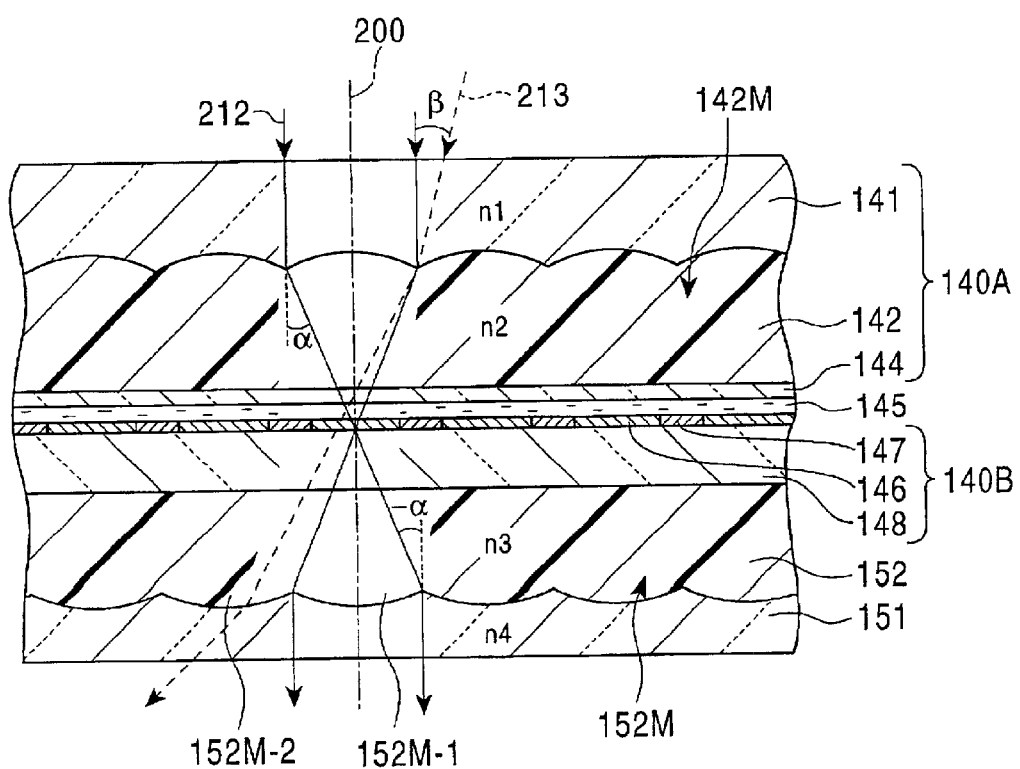
FIG. 11 is a cross-sectional view showing another example of a structure of the liquid crystal panel.

Equation (8) shows that the divergence angle θ of the light emerging from the liquid crystal panel 25 is also determined only by two parameters, namely, the radius "a" of the microlens 42M and the focal length f2 of the second lens surface R2, and that the divergence angle β of the illumination light does not have any influence on the divergence angle θ of the emergent light. That is, according to this embodiment, the divergence angle β of the illumination light is removed when the illumination light emerges from the liquid crystal panel 25, and the divergence angle θ can be made smaller by the angle β than in the related art shown in FIG. 10. Accordingly, even when the focal length of the microlens 42M is reduced, it is possible to reduce the degree of eclipse of light at the black matrix portion 47. This makes it possible to substantially reduce the focal length of the microlens 42M without decreasing the effective aperture ratio, and to substantially reduce the size of a light spot formed in the pixel aperture 46A. As a result, the effective aperture ratio of the liquid crystal panel 25 can be increased.

Moreover, since the size of the light spot at the pixel aperture 46A can be satisfactorily reduced in this embodiment, compared with the related art, the incident divergence angle β can be increased. As shown in FIG. 3, by increasing the incident divergence angle β, the light spot size can be increased to the aperture size of the pixel aperture 46A, and the amount of emergent light can be increased. The increase in incident divergence angle β is significant for the amount of light incident on the liquid crystal panel 25 and for the size of a housing for accommodating the optical system.

Figure 9:
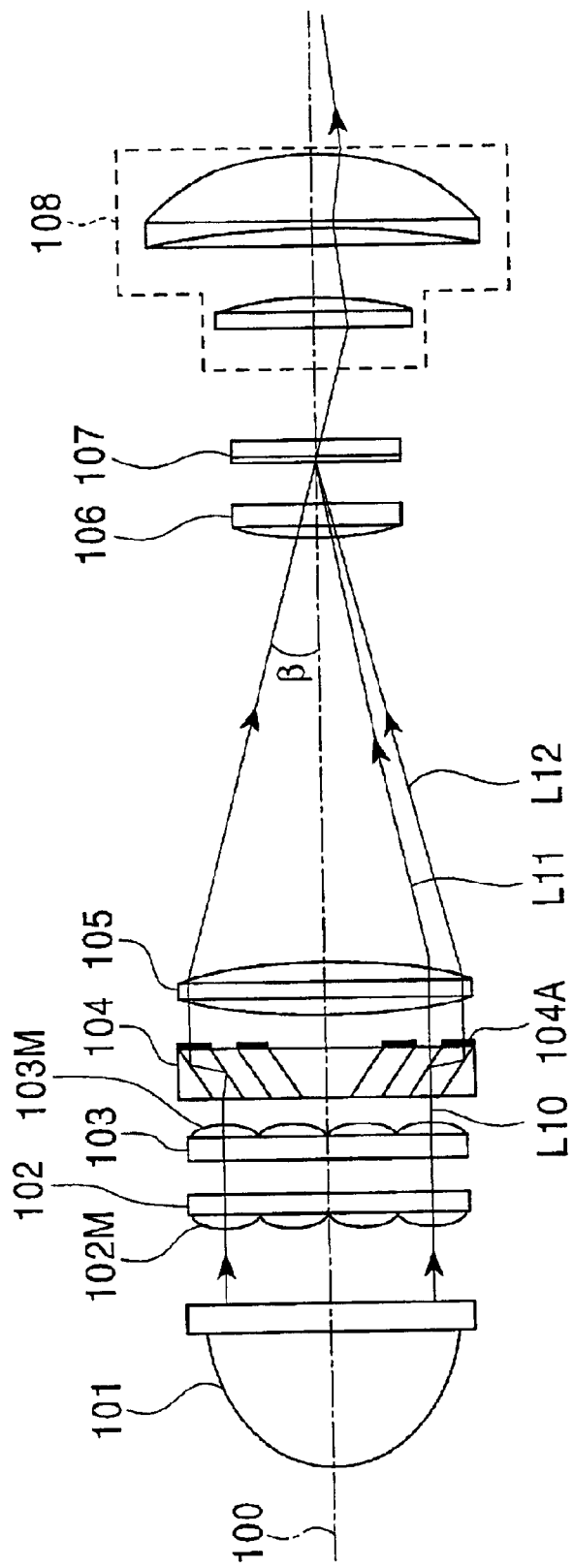
FIG. 9 is a plan view showing the general configuration of an optical system in a known type of projection type liquid crystal display device.

In a manner similar to that of the related art described with reference to FIG. 9, the divergence angle β of illumination light incident on the liquid crystal panel 25 is defined by the following Equation (3):

$$\tan \beta = rc/fc \quad (3)$$

Where fc represents the focal length of the condenser lens 16, and rc represents the radius thereof.

In this way, the divergence angle β is a parameter determined by the radius rc and focal length fc of the condenser lens 16. However, since the radius rc of the condenser lens 16 is substantially determined by the size of the lamp forming the light source 11, when the divergence angle β increases, the focal length fc decreases. On the other hand, the magnification M of each microlens 12M of the first MLA 12 (a fixed value corresponding to the similitude ratio of the illumination area of the liquid crystal panel 25 and the first MLA 12) is the ratio of the focal length $f_{MLA2}$ of each microlens 13M of the second MLA 13 and the focal length fc of the condenser lens 16, as is given by the following Equation (7). The small beams separated by the MLAs 12 and 13 are enlarged to the magnification M so as to illuminate the liquid crystal panel.

$$M = fc/f_{MLA2} \quad (7)$$

For this reason, reducing the focal length fc of the condenser lens 16 in order to increase the divergence angle β means that the focal length $f_{MLA2}$ of each microlens 13M of the second MLA 13 must also be reduced. Since the distance between the two MLAs 12 and 13 decreases as the focal length $f_{MLA2}$ decreases, the total size of the optical system can be reduced. Consequently, the size of the housing for the optical system is reduced.

As shown in FIG. 4, when the effective diameter of one microlens 13M of the second MLA 13 is designated D, the PS beam combiner 15 can convert only the polarized light component of the light incident on the aperture having a size of approximately D/2 for one microlens 13, in consideration of the structure of the PS beam combiner 15. Therefore, in order to improve the efficiency of collecting the light into the PS beam combiner 15, it is preferable to decrease the diameter of the light beam incident on the PS beam combiner 15 by reducing the size of a light-source image on the second MLA 13. The size of the light-source image formed on the second MLA 13 is generally given by the following Equation (8) concerning the arc length of the lamp forming the light source 11 and the distance between the reflection mirror and the arc in the light source 11 (arc-mirror distance):

$$\text{lamp arc length} \times f_{MLA2}/\text{arc-mirror distance} \quad (8)$$

This shows that the light-source image on the second MLA 13 is made smaller by increasing the divergence angle β in order to decrease the focal length $f_{MLA2}$. Consequently, it is possible to improve the efficiency of collecting the light into the second MLA 13 and the PS beam combiner 15, to increase the light output in the entire illumination system disposed upstream from the liquid crystal panel 25, and to increase the amount of incident light on the liquid crystal panel 25.

As described above, by increasing the divergence angle β of the incident light on the liquid crystal panel 25, it is possible both to reduce the size of the housing for the optical system and to increase the light output of the entire illumination system.

EXAMPLE

FIG. 5A shows a concrete example of the effective aperture ratio (the efficiency of collecting light into the projection lens) in a case in which the liquid crystal panel with the structure shown in FIG. 2 was used. In this example, the effective aperture ratio was calculated under the simulation conditions shown in FIG. 5B. As shown in FIG. 5B, the dot size (corresponding to "2a" shown in FIG. 3) was set at 18 μm×18 μm, and the size of the pixel aperture 46A was set at 12 μm×12 μm. As the illumination optical system, a fly-eye integrator optical system for a 0.9-inch panel was used (the divergence angle β of incident light on the liquid crystal panel was ±9°). The F-number of the projection lens 27 was set at 1.7 (the divergence angle θ of emergent light from the liquid crystal panel was 17.1°).

With such simulation conditions, when the synthetic focal length f of the microlens 42M was 41 μm and the distance between the second lens surface 2R and the pixel aperture 46A was 8 μm, the effective aperture ratio was 96% as a result of calculation. For comparative examples, simulations were run using a conventional single-lens light-collecting microlens in which only one lens surface had power (see FIG. 10). In a first comparative example, the focal length of the microlens was set at 70 μm, which was rather long, and the effective aperture ratio was 86%. In a second comparative example, the focal length of the microlens was set at 41 μm, which was rather short, and the effective aperture ratio was 77%.

Since the eclipse of the projection lens is large when the focal length is short under the conditions of the comparative examples, the effective aperture ratio when the focal length was 70 μm was approximately 10% higher than that when the focal length was 41 μm. In contrast, in this example, the synthetic focal length was short (f=41 μm) in a manner similar to the second comparative example, but the effective aperture ratio was 10% higher than that of the first comparative example, in which the focal length was longer. This is because the divergence angle β of incident illumination light was nullified by the optical action of the microlens 42M. In particular, since the results of the simulations include the reflection loss at the interface between the surfaces having different refractive indices, it is thought that 4% (100%–96%) corresponds to the reflection loss. That is, in this example, it is thought that the eclipse is rarely caused by the black matrix portion or the projection lens, and that the microlens 42M is effective in increasing the effective aperture ratio.

As described above, according to this embodiment, the microlens 42M having the two lens surfaces R1 and R2 is placed corresponding to each pixel aperture, the focal position of the second lens surface R2 is made to substantially coincide with the principal point H1 of the first lens surface R1, and the focal position of the entire microlens is made to substantially coincide with the position of the pixel aperture 46A. Therefore, it is possible to remove the divergence angle component β of the incident light with respect to the optical axis when the light emerges from the microlens 42M. This increases the effective aperture ratio of the liquid crystal panel, and enhances the efficiency for light utilization of the entire illumination optical system. In addition to such an increase in light output, it is possible to reduce the size of the illumination optical system and to reduce the cost of the projection lens. Therefore, size reduction and an increase in brightness are possible, and working of the microlens is facilitated.

In this way, this embodiment makes it possible to increase the effective aperture ratio and to enhance the efficiency of light utilization without enlarging the structure and enhancing the difficulty of production.

[Modifications]

Figure 6A:
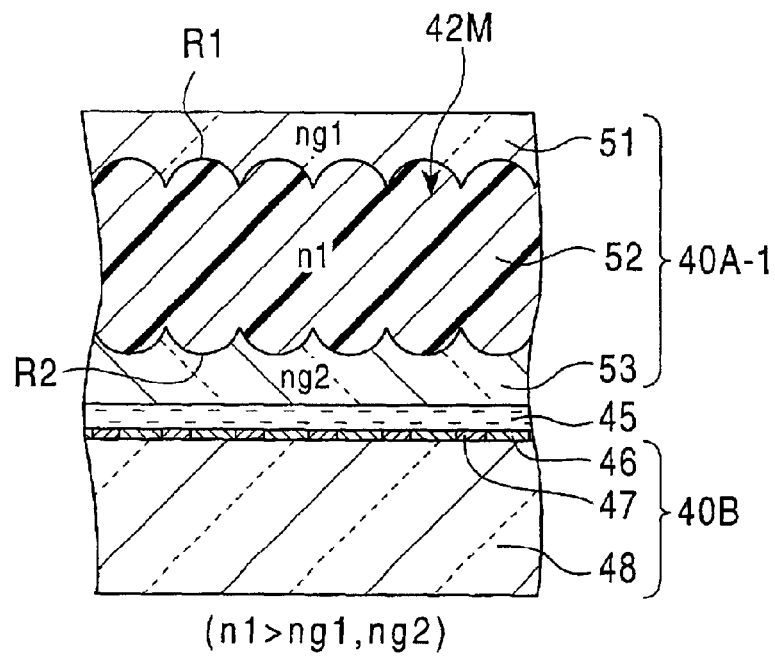
FIGS. 6A and 6B are cross-sectional views showing modifications of the liquid crystal panel shown in FIG. 2.
Figure 6B:
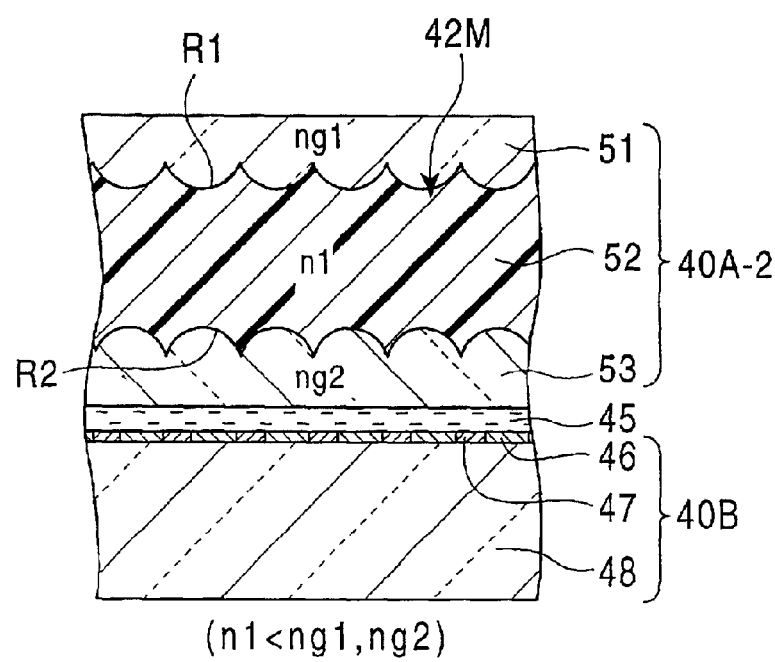

FIGS. 6A and 6B show modifications of the structure of the liquid crystal panel 25. Referring to FIGS. 6A and 6B, counter substrates 40A-1 and 40A-2 are different from that shown in FIG. 2. While the lens surfaces R1 and R2 of the microlens 42M are formed by the interfaces between the resin layers in FIG. 2, they may be formed by the interfaces between glass and resin (or an air space). In FIGS. 6A and 6B, a microlens 42M is formed by placing a resin layer 52 having a refractive index n1 between two glass layers 51 and 53 having refractive indices ng1 and ng2. A first lens surface R1 is formed by the interface between the glass layer 51 and the resin layer 52, and a second lens surface R2 is formed by the interface between the glass layer 53 and the resin layer 52. In this case, the shapes of the lens surfaces R1 and R2 are determined by the difference in refractive index between the two interfaces.

In the structure shown in FIG. 6A, the refractive indices of the resin layer 52 and the glass layers 51 and 53 have a relationship n1>ng1 and ng2. In this case, the first lens surface R1 is convex on the light incident side (light-source side), and the second lens surface R2 is convex on the light emergent side. In contrast, in the structure shown in FIG. 6B, the refractive indices of the resin layer 52 and the glass layers 51 and 53 have a relationship n1<ng1 and ng2. In this case, the first lens surface R1 is concave on the light incident side, and the second lens surface R2 is concave on the light emergent side. In FIG. 6B, the resin layer 52 may be replaced with an air space.

The counter substrates 40A-1 and 40A-2 of the liquid crystal panels shown in FIGS. 6A and 6B are produced by, for example, first forming patterns of the lens surfaces R1 and R2 on the surfaces of two glass substrates, respectively, placing the glass substrates opposed to each other, and filling the space therebetween with an optical resin (for example, urethane or acrylic resin) serving as the material of the resin layer 52. The surfaces of the glass substrates may be treated by, for example, various etching methods such as isotropic etching, anisotropic etching, and dry etching.

In contrast to the structure shown in FIG. 2, the resin layers 43A and 43B are omitted from the counter substrates 40A-1 and 40A-2 in FIGS. 6A and 6B. Therefore, it is possible to reduce the number of resin layers and to reduce the cost.

Figure 7A:
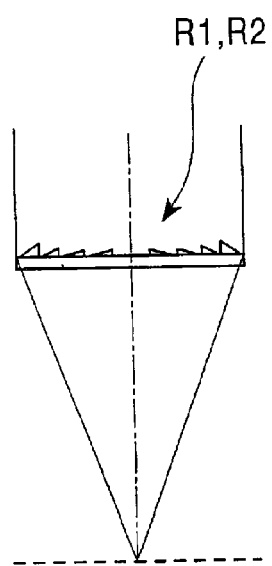
FIGS. 7A to 7C are explanatory views showing modifications of surface shapes of the microlens.
Figure 7B:
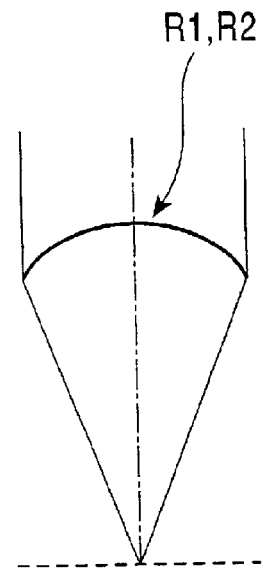
Figure 7C:
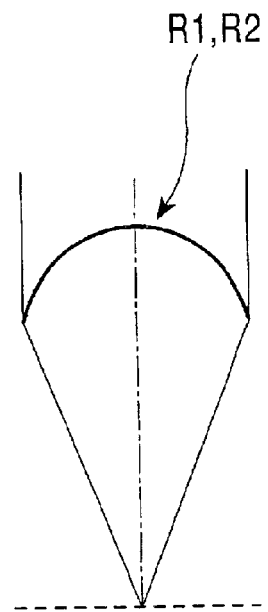

FIGS. 7A and 7B show modifications to the shape of the lens surfaces R1 and R2 of the microlens 42M. The lens surfaces R1 and R2 may not only be spherical (FIG. 7C), but also be aspherical, such as elliptic(FIG. 7B), or be of a Fresnel-type (FIG. 7A). While the spherical lens can be easily treated, the radius of curvature which minimizes the focal length is limited by the dot size, and therefore, decreasing the focal length is difficult unless a sufficient difference in refractive index at the lens interface is ensured. In contrast, the aspherical surface and the Fresnel surface have the advantages of a shorter focal length and a flat principal plane, as shown in the figures, and are effective in nullifying the divergence angle β.

Figure 8:
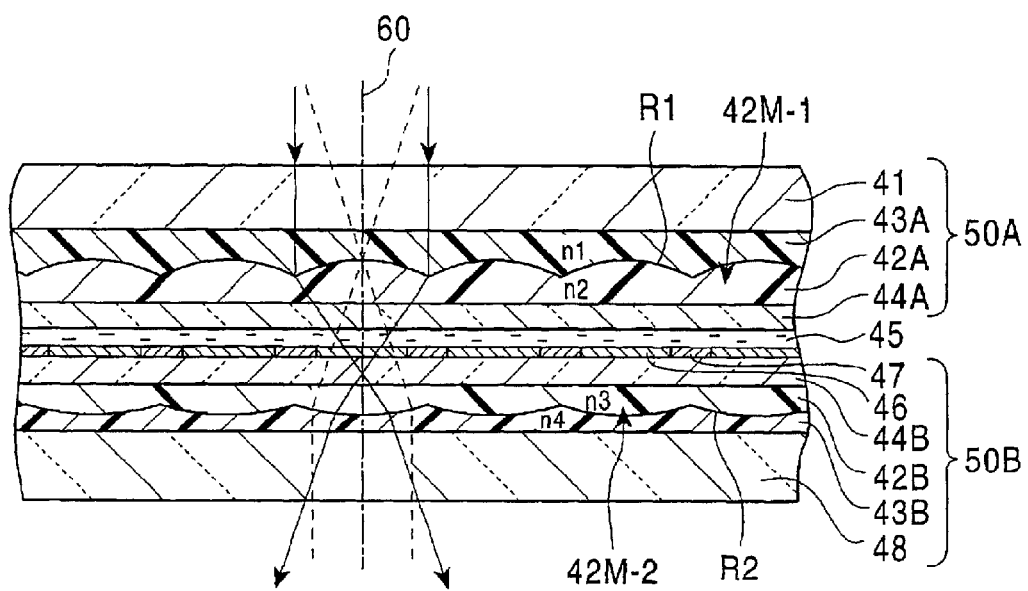
FIG. 8 is a cross-sectional view showing another modification of the liquid crystal panel shown in FIG. 2.

FIG. 8 shows another modification of the structure of the liquid crystal panel 25. In this modification, a light-collecting lens surface is disposed in a counter substrate, and a lens surface having a field function is disposed in a pixel electrode substrate. This liquid crystal panel includes a pixel electrode substrate 50B, and a counter substrate 50A disposed on the light incident side of the pixel electrode substrate 50B and opposed thereto with a liquid crystal layer 45 therebetween.

The counter substrate 50A includes a glass substrate 41, a resin layer 43A, a first microlens array 42A, and a cover glass 44A arranged in that order from the light incident side. On the other hand, the pixel electrode substrate 50B includes pixel electrode portions 46 and black matrix portions 47, a cover glass 44B, a second microlens array 42B, a resin layer 43B, and a glass substrate 48 arranged in that order from the light incident side.

The first microlens array 42A is made of an optical resin, and includes a plurality of first microlenses 42M-1 arranged in a two-dimensional form corresponding to the pixel electrode portions 46. Each of the microlenses 42M-1 has a first lens surface R1 with a positive power, and functions as a light-collecting lens. The refractive index n1 of the resin layer 43A and the refractive index n2 of the first microlens array 42A have a relationship n2>n1, and the first lens surface R1 is convex on the light incident side (light-source side).

Similarly, the second microlens array 42B is made of an optical resin, and includes a plurality of second microlenses 42M-2 arranged in a two-dimensional form corresponding to the pixel electrode portions 46. Each of the microlenses 42M-2 has a second lens surface R2 with a positive power, and functions as a field lens. That is, the focal position of the second lens surface R2 substantially coincides with the principal point of the first lens surface R1 (the first microlens 42M-1). The refractive index n4 of the resin layer 43B and the refractive index n3 of the second microlens array 42B have a relationship n3>n4, and the second lens surface R2 is convex on the light emergent side.

The modification shown in FIG. 8 is different from the structure shown in FIG. 2 in that the pixel aperture 46A is placed between the two microlenses 42M-1 and 42M-2 (two lens surfaces R1 and R2), whereas it is the same in that the synthetic focal position of the two microlenses 42M-1 and 42M-2 is placed adjacent to the pixel aperture 46A. The alignment of the synthetic focal position and the position of the pixel aperture 46 can be controlled by, for example, adjusting the distances between the microlenses 42M-1 and 42M-2 and the pixel aperture 46A. It is thought that the structure of this modification achieves the highest vignetting factor, but makes working most difficult.

The above modifications shown in FIGS. 6 to 8 are not independent of one another, and may be arbitrarily combined.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. For example, while only two lens surfaces having power are provided for one dot in the above embodiments, the number of lens surfaces for one dot may be three or more. The present invention is applicable not only to a three-panel projection type liquid crystal display device, but also to a single-panel projection type liquid crystal display device.

What is claimed is:

1. A liquid crystal display element comprising:

a liquid crystal layer;

a pixel electrode portion having a plurality of pixel apertures for transmitting light; and at least one microlens array having a plurality of microlenses arranged in a two-dimensional form on at least one of a light incident side and a light emergent side of said liquid crystal layer corresponding to said pixel apertures, wherein each of said microlenses comprises:

a light-collecting lens having at least one lens surface in the optical axis direction for collecting incident light toward corresponding one of said pixel apertures, the light-collecting lenses of the plurality of microlenses being continuous in the two-dimensional form; and a field lens having at least one lens surface in the optical axis direction so that the focal position thereof substantially coincides with the principal point of said light-collecting lens, the field lenses of the plurality of microlenses being continuous in the two-dimensional form.

2. A liquid crystal display element according to claim 1, wherein the focal position of the entirety of each of said microlenses substantially coincides with said corresponding pixel aperture.

3. A liquid crystal display element according to claim 1, wherein, when incident light having a divergence angle component with respect to the optical axis emerges from said microlens array, the divergence angle component is removed by the optical action of said field lens, and the emergent angle of the incident light substantially coincides with the emergent angle of a principal ray which enters in parallel with the optical axis.

4. A liquid crystal display element according to claim 1, wherein said liquid crystal display element is applied to a projection type liquid crystal display device which projects light transmitted through said liquid crystal display element via a projection lens, and the numerical aperture of each of said microlens substantially coincides with the F-number of said projection lens.

5. A liquid crystal display element according to claim 1, wherein each of said microlenses is formed of one or more of a spherical surface, an aspherical surface, and a Fresnel surface.

6. A projection type liquid crystal display device comprising:

a light source for emitting light;

a liquid crystal display element for optically modulating incident light; and a projection lens for projecting the light modulated by said liquid crystal display element, wherein said liquid crystal display element comprises:

a liquid crystal layer;

a pixel electrode portion having a plurality of pixel apertures for transmitting light; and at least one microlens array having a plurality of microlenses arranged in a two-dimensional form on at least one of a light incident side and a light emergent side of said liquid crystal layer corresponding to said pixel apertures, and wherein each of said microlenses comprises:

a light-collecting lens having at least one lens surface in the optical axis direction for collecting incident light toward corresponding one of said pixel aperture, the light-collecting lenses of the plurality of microlenses being continuous in the two-dimensional form; and a field lens having at least one lens surface in the optical axis direction so that the focal position thereof substantially coincides with the principal point of said light-collecting lens, the field lenses of the plurality of microlenses being continuous in the two-dimensional form.

* * * * *